(12) United States Patent
Beer et al.

(10) Patent No.: US 6,712,345 B2
(45) Date of Patent: Mar. 30, 2004

(54) POWERTRAIN MOUNT WITH HIGH FREQUENCY PLUNGER

(75) Inventors: Ronald A. Beer, Fairborn, OH (US); James P. Hamberg, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/939,503

(22) Filed: Aug. 24, 2001

(65) Prior Publication Data

US 2003/0038413 A1 Feb. 27, 2003

(51) Int. Cl.[7] .............................................. F16M 13/00
(52) U.S. Cl. .................. 267/140.13; 267/141
(58) Field of Search ...................... 267/140.11, 140.13, 267/141, 140.3, 140.4, 141.1; 248/562, 636

(56) References Cited

U.S. PATENT DOCUMENTS

| | | | | |
|---|---|---|---|---|
| 4,588,173 A | | 5/1986 | Gold et al. | |
| 4,607,828 A | * | 8/1986 | Bodin et al. | 267/140.11 |
| 4,826,126 A | * | 5/1989 | Katayama et al. | 248/562 |
| 4,905,955 A | | 3/1990 | Brizzolesi et al. | |
| 4,921,049 A | | 5/1990 | Kaiser et al. | |
| 5,240,233 A | * | 8/1993 | Kato et al. | 267/140.13 |
| 5,263,693 A | | 11/1993 | Klein | |
| 5,284,315 A | * | 2/1994 | Hofmann et al. | 248/562 |
| 5,772,189 A | * | 6/1998 | Satori et al. | 267/140.13 |
| 6,131,893 A | * | 10/2000 | Seynaeve et al. | 267/140.11 |

* cited by examiner

Primary Examiner—Christopher P. Schwartz
Assistant Examiner—Melanie Torres
(74) Attorney, Agent, or Firm—Michael D. Smith

(57) ABSTRACT

A mount for a powertrain component of a motor vehicle comprises first and second mounting members, an elastomeric body connected to the first mounting member and connected to the second mounting member, and a plate. The plate defines first and second chambers, and has an orifice for the passage of fluid therethrough. A plunger having at least one hole is connected to the first mounting member, and a compliance member is disposed proximate the at least one hole.

8 Claims, 1 Drawing Sheet

US 6,712,345 B2

POWERTRAIN MOUNT WITH HIGH FREQUENCY PLUNGER

TECHNICAL FIELD OF THE INVENTION

The present invention relates to powertrain mounts for motor vehicles, and more particularly to a powertrain mount having a high frequency plunger.

BACKGROUND OF THE INVENTION

It is desirable to provide motor vehicles with improved operating smoothness by damping and/or isolating powertrain vibrations of the vehicle. A variety of mount assemblies are presently available to inhibit such engine and transmission vibrations. Many of these mount assemblies combine the advantageous properties of elastomeric materials with hydraulic fluids. A hydraulic mount assembly of this type typically includes a reinforced, hollow rubber body that is closed by a resilient diaphragm so as to form a cavity. This cavity is separated into two chambers by a plate. The chambers are in fluid communication through a relatively large central orifice in the plate. The first or primary chamber is formed between the partition plate and the body. The secondary chamber is formed between the plate and the diaphragm.

A decoupler may be positioned in the central passage of the plate to reciprocate in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes and generally higher frequencies, fluid flow between the chambers is substantially avoided and undesirable hydraulic damping is eliminated. In effect, this decoupler is a passive tuning device.

In addition to the relatively large central passage, an orifice track with a smaller, restricted flow passage is provided extending around the perimeter of the orifice plate. Each end of the track has an opening; one opening communicating with the primary chamber and the other with the secondary chamber. The orifice track provides the hydraulic mount assembly with another passive tuning component, and when combined with the decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. In contrast, large amplitude vibrating inputs, such as large suspension inputs, produce high velocity fluid flow through the orifice track, and an accordingly high level of damping force and desirable control and smoothing action. A third or intermediate operational mode of the mount occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving around the edges of the decoupler, smoothing the transition.

Powertrain mounts are also known which include a plunger. This plunger, also known as an interlock, creates a desirable dip in the dynamic rate of the mount above about 100 Hz. However, mounts with plungers also exhibit an undesirably steep rate increase after the dip.

SUMMARY OF THE INVENTION

The present invention is a mount for a powertrain component of a motor vehicle. The mount comprises first and second mounting members, an elastomeric body connected to the first mounting member and connected to the second mounting member, and a plate. The plate defines first and second chambers, and has an orifice for the passage of fluid therethrough. A plunger having at least one hole is connected to the first mounting member, and a compliance member is disposed proximate the at least one hole.

Accordingly, it is an object of the present invention to provide an improved hydraulic-elastomeric mount assembly overcoming the limitations and disadvantages of the prior art.

Another object of the present invention is to provide a fully passively tuned hydraulic mount assembly exhibiting significantly improved high frequency tuning characteristics while maintaining the desired damping for control of high amplitude, low frequency vibrational inputs.

Still another object of the present invention is to provide an improved hydraulic mount assembly including a plunger having a compliance member disposed proximate holes in the plunger.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
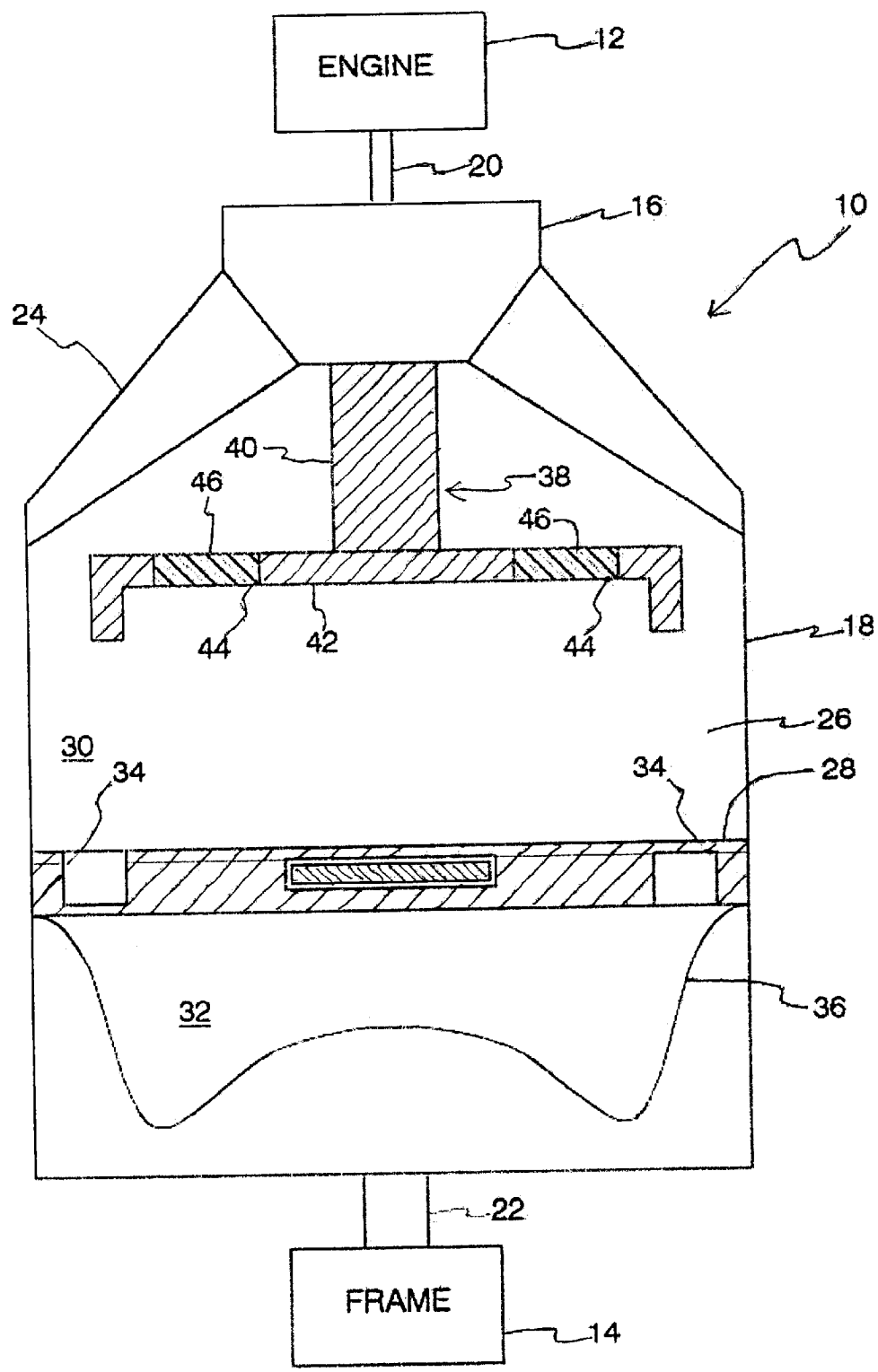
FIG. 1 is a schematic cross-sectional view of a powertrain mount according to the present invention for a motor vehicle.

FIG. 1 shows an improved hydraulic-elastomeric mount assembly 10 according to the present invention. The mount assembly 10 is particularly adapted for mounting an internal combustion engine and/or transmission 12 to a frame 14 in a vehicle. The dynamic characteristics of the mount assembly 10 may be tuned to meet the operational parameters and needs of the specific application. As a result, the desired dynamic rate best suited to isolate a particular range of vibration/noise conditions may be obtained. Simultaneously, the desired damping to provide the necessary control of large amplitude vibrational inputs is also provided.

The mount assembly 10 includes a cast aluminum mounting member 16 and a metal body 18. A pair of studs 20 and 22 project outwardly to respectively attach the mounting assembly 10 to the engine 12 and to the frame 14. A hollow elastomeric body 24 interconnects the mounting members 16 and 18. The body 24 is preferably constructed of natural or synthetic rubber. More specifically, the body may be molded to and about the mounting member 16 and to both the interior and exterior of a retainer on the body 18. The elastomeric body 24 is configured to form a hollow cavity 26 for receiving a damping liquid, such as a commercial engine antifreeze coolant. Voids may also be provided in the elastomeric body 24 to assist in providing directional dynamic rate control. As is known in the art, such voids may be useful in isolating certain internal combustion engine vibrations.

A die-case metal or plastic partition plate 28 spans the cavity 26 to define primary chamber 30 and secondary chamber 32. The partition 28 includes an orifice track 34 to permit the flow of fluid between the chambers 30 and 32, and the orifice track 34 may be provided with a decoupler. An elastomeric diaphragm 36 of natural or synthetic rubber further defines the chamber 32. The diaphragm 36 may include an annular rim section having a radially inwardly facing internal groove formed between upper and lower shoulders such as is described in U.S. Pat. No. 5,263,693, the disclosure of which is hereby incorporated by reference. The shoulders are normally flexible so as to sealingly receive the periphery of the partition 28.

The elastomeric diaphragm 36 closes the elastomeric body 24 so as to form the chambers 30 and 32 as defined by the partition 28. A plunger 38 is disposed in the chamber 30. The plunger 38 includes an extension 40 descending from the first mounting member 16, and a head 42 extending generally perpendicularly from the extension. The head 42 has a plurality of holes 44 which normally allow fluid in the chamber 30 to flow therethrough. Disposed proximate each of the holes 44 is a compliance member 46. The compliance members 46 are preferably formed of an elastomer such as natural or synthetic rubber. In a preferred embodiment, the compliance members 46 are physically disposed in the holes 44, but it should be appreciated that the present invention also contemplates disposing the compliance members 46 over the holes in the head 42 of the plunger 38 such as by molding them in place.

In operation, when the hydraulic mount assembly 10 is subjected to vibration, the plunger 38 is displaced and fluid in the chamber 30 is forced against the compliance members 46. At relatively low frequencies, such as below about 100 Hz, the compliance members 46 are relatively stiff. As a result, the desired plunger effect of a rate dip is achieved. The compliance of the members 46, however, reduces the dynamic rate increase normally found with prior art devices at frequencies above the rate dip. Accordingly, the mount assembly 10 of the present invention can be said to exhibit relatively soft characteristics that are desirable for passenger comfort.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A mount for a powertrain component of a motor vehicle, the mount comprising:
   first and second mounting members;
   an elastomeric body connected to the first mounting member and connected to the second mounting member;
   a plate defining first and second chambers, the plate having an orifice for the passage of fluid therethrough;
   a plunger connected to the first mounting member, the plunger having at least one hole; and
   a compliance member disposed proximate the at least one hole.

2. The mount of claim 1 wherein the compliance member comprises an elastomer.

3. The mount of claim 1 wherein the compliance member comprises rubber.

4. The mount of claim 1 wherein the powertrain component comprises an engine.

5. The mount of claim 1 wherein the powertrain component comprises a transmission.

6. An engine mount for a motor vehicle, the mount comprising:
   first and second mounting members;
   an elastomeric body connected to the first mounting member and connected to the second mounting member;
   a plate defining first and second chambers, the plate having an orifice for the passage of fluid therethrough;
   a plunger connected to the first mounting member, the plunger having at least one hole; and
   a compliance member disposed in the at least one hole.

7. The engine mount of claim 6 wherein the compliance member comprises an elastomer.

8. The engine mount of claim 6 wherein the compliance member comprises rubber.

* * * * *